(12) United States Patent
Kamai et al.

(10) Patent No.: US 10,227,516 B2
(45) Date of Patent: Mar. 12, 2019

(54) ADHESIVE FOR FOOD PACKAGING FILMS

(71) Applicant: Henkel AG & Co. KGaA, Duesseldorf (DE)

(72) Inventors: Noriyoshi Kamai, Osaka (JP); Yasushi Yamada, Osaka (JP); Hitoshi Ikeda, Osaka (JP)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/176,816

(22) Filed: Jun. 8, 2016

(65) Prior Publication Data

US 2016/0280978 A1 Sep. 29, 2016

Related U.S. Application Data

(63) Continuation of application No. PCT/JP2014/083637, filed on Dec. 15, 2014.

(30) Foreign Application Priority Data

Dec. 16, 2013 (JP) ................................. 2013-259407

(51) Int. Cl.
| | |
|---|---|
| *C08G 18/10* | (2006.01) |
| *C08G 18/42* | (2006.01) |
| *C08G 18/75* | (2006.01) |
| *C08G 18/80* | (2006.01) |
| *C09J 175/06* | (2006.01) |

(52) U.S. Cl.
CPC ............ *C09J 175/06* (2013.01); *C08G 18/10* (2013.01); *C08G 18/4211* (2013.01); *C08G 18/4216* (2013.01); *C08G 18/755* (2013.01); *C08G 18/8025* (2013.01); *C08G 18/8029* (2013.01)

(58) Field of Classification Search
CPC ....... C09J 175/06; C09J 175/12; C08G 18/10; C08G 18/4211; C08G 18/755; C08G 18/4205; C08G 18/4615; C08G 18/8025; C08G 18/4216; C08G 18/8029; C08G 18/42

See application file for complete search history.

(56) References Cited

U.S. PATENT DOCUMENTS

| | | | |
|---|---|---|---|
| 5,096,980 A | 3/1992 | Yamazaki et al. | |
| 6,846,894 B2 | 1/2005 | Terada et al. | |
| 7,364,796 B2 | 4/2008 | Sasano et al. | |
| 8,097,079 B2 | 1/2012 | Terada et al. | |
| 2003/0096110 A1 | 5/2003 | Terada et al. | |
| 2013/0280537 A1* | 10/2013 | Ohta ................... | C08G 18/4213 428/423.1 |

FOREIGN PATENT DOCUMENTS

| | | |
|---|---|---|
| CN | 1671815 A | 9/2005 |
| CN | 101370890 A | 2/2009 |
| JP | H08183829 A | 7/1996 |
| JP | H08183943 A | 7/1996 |
| JP | 2683937 B2 | 12/1997 |
| JP | 2000154365 A | 6/2000 |
| JP | 2003113359 A | 4/2003 |
| JP | 2003129024 A | 5/2003 |
| JP | 3583629 B2 | 11/2004 |

OTHER PUBLICATIONS

International Search Report for International PCT Patent Application No. PCT/JP2014/083637 dated Apr. 8, 2015.

* cited by examiner

*Primary Examiner* — Rabon A Sergent

(74) *Attorney, Agent, or Firm* — James E. Piotrowski

(57) ABSTRACT

Disclosed is an adhesive for food packaging films, comprising a urethane resin obtainable by mixing: (A) a polyesterpolyurethane polyol; (B) a polyester polyol; and (C) an isocyanate component. The polyesterpolyurethane polyol (A) is obtainable by chain extension of (a1) a polyester polyol with (a2) an isocyanate compound. The equivalent ratio (NCO/OH) of the isocyanate group of the isocyanate compound (a2) to the hydroxyl group of the polyester polyol (a1) is 0.6 to 0.85. The polyester polyol (B) has a glass transition temperature of −20 to 10° C. Also disclosed is a food packaging film comprising the adhesive.

17 Claims, 1 Drawing Sheet

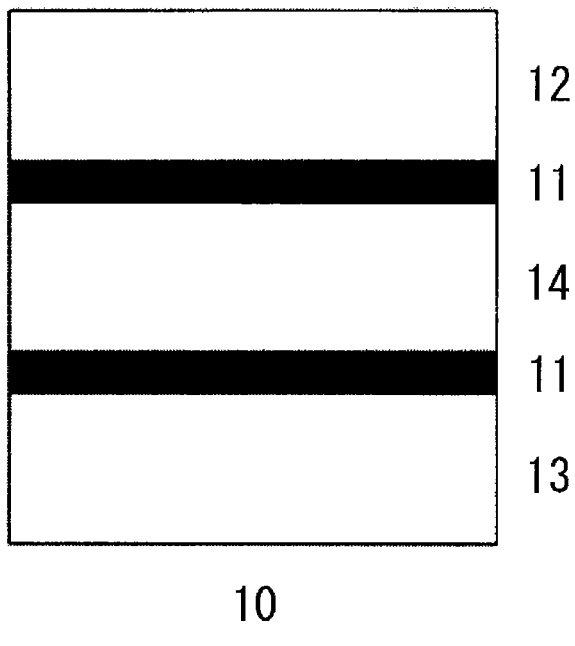

ADHESIVE FOR FOOD PACKAGING FILMS

CROSS-REFERENCE TO RELATED APPLICATIONS

This application claims benefit under Paris Convention of Japanese Patent Application No. 2013-259407 filed on Dec. 16, 2013, incorporated herein by reference in its entirety.

TECHNICAL FIELD

The present invention relates to an adhesive for food packaging films.

BACKGROUND ART

Food packaging films are composite laminate films, and are composed of various plastic films and/or metal foils having a thickness of approximately 5 to 100 μm. Examples of the plastic films include plastic films made of polyolefins such as polyethylenes and polypropylenes, copolymers of olefins, polyvinyl chlorides, polyvinylidene chlorides, polyesters, polyamides and the like. Examples of the metal foils include metal foils made of aluminum, stainless steel and the like.

These plastic films and metal foils are characterized by properties such as strength, water resistance, moisture permeability resistance, oxygen permeability resistance, and heat resistance. Therefore, high performance food packaging films, which cannot be obtained by using only a single film, can be provided by laminating two or more kinds of films, if necessary. Examples of adhesives used for producing the food packaging films include predominantly urethane adhesives. Patent Documents 1 to 3 disclose that a food packaging film is produced by laminating a plastic film using a urethane adhesive.

Patent Document 1 discloses an adhesive for food packaging films in which a carboxylic acid or an anhydride thereof, and an epoxy resin are mixed to form a urethane resin (see [claim 1] and [Examples] of Patent Document 1). Patent Document 2 discloses that a food packaging urethane adhesive is synthesized by mixing a polyisocyanate with a mixed polyol obtainable by mixing a polyester polyol having a glass transition temperature of 40° C. or higher with an organic polyol having a glass transition temperature of lower than 40° (see [claim 1] and respective Synthesis Examples of [Examples] of Patent Document 2).

Patent Document 3 discloses a urethane adhesive synthesized by mixing a polyol having a high number average molecular weight with a polyol having a low number average molecular weight, and mixing a polyisocyanate in the mixed polyol (see [claim 1] of Patent Document 3). In Examples, a polyol A is a polyester polyol, polyols B and C are polyetherpolyurethane polyols, and polyols D and E are polyesterpolyurethane polyols. A food packaging bag (or pouch) is produced by the urethane adhesive synthesized from these polyols and polyisocyanates, and appearance of the packaging bag after a boiling sterilization treatment is evaluated (see [0068], [Table 1] and [Table 2] of Patent Document 3).

Patent Document 4 discloses a urethane adhesive for laminates, comprising a silane coupling agent as an essential component (see [claim 1] of Patent Document 4). In Examples, a polyol A is a polyesterpolyurethane polyol, and polyols B and C are polyesterpolyurethane polyols. A composite film was produced by a urethane adhesive synthesized from these polyols and polyisocyanates, a bag was produced by using the composite film, and then the bag was subjected to steam sterilization and the peeling state (delamination) was evaluated (see [0090], [Table 1] and [Table 2] of Patent Document 4).

The object of Patent Documents 1 to 4 is to improve peel strength, heat resistance, and water resistance on boiling of the urethane adhesives, and each of these urethane adhesives of these documents is suitable for lamination of a food packaging film. However, in recent years, it is needed for the adhesive for food packaging films that appearance of the food packaging film is not adversely affected, even though a food packaging bag is produced, contents are put into the food packaging bag, the food packaging bag is subjected to sterilization and further stored over a certain period of time. In other words, the adhesive for food packaging films is required to be excellent in contents resistance. Considering workability in producing a packaging bag by using a film, it is important that the adhesive for food packaging films has appropriate viscosity to be easily applied, and is excellent in initial adhesion after lamination of a film.

The urethane adhesives of Patent Documents 1 to 4 exhibit peel strength improved by the addition of an epoxy resin or silane coupling agent and mixing of a plurality of polyols. However, the contents resistance and the initial adhesion are still insufficient, and it is necessary to further improve them.

Patent Document 1: JP 2683937 B
Patent Document 2: JP 3583629 B
Patent Document 3: JP 2003-129024 A
Patent Document 4: JP 4226852 B

SUMMARY OF INVENTION

Problems to be Solved by the Invention

The present invention has been made so as to solve such a problem and an object thereof is to provide an adhesive for food packaging films, wherein the adhesive is easily applied (excellent in coating suitability or coatability) and is excellent in initial adhesion to a plastic film after the application when a food packaging film (laminate film) is produced by laminating the plastic film, wherein the adhesive also has high peel strength even after contents are put into a food packaging bag produced by using the food packaging film and are subjected to sterilization, and wherein the adhesive can maintain appearance of the food packaging film of the food packaging bag (excellent in contents resistance) even when the food packaging bag is stored over a long period of time at high temperature.

Means for Solving the Problems

The present inventors have intensively studied and found, surprisingly, that it is possible to obtain a urethane resin, which is easy to apply and is excellent in initial adhesion, and also has high peel strength after sterilization and is excellent in contents resistance, when a plurality of specific polyol components are mixed and formulated with an isocyanate component in producing the urethane adhesive. Thus, the present invention has been completed.

The present invention provides, in an aspect, an adhesive for food packaging films, comprising a urethane resin obtainable by mixing: (A) a polyesterpolyurethane polyol; (B) a polyester polyol; and (C) an isocyanate component, wherein the polyesterpolyurethane polyol (A) is obtainable by chain extension of (a1) a polyester polyol with (a2) an isocyanate compound, and an equivalent ratio (NCO/OH) of the isocyanate group of the isocyanate compound (a2) to the hydroxyl group of the polyester polyol (a1) is from 0.60 to 0.85, and wherein the polyester polyol (B) has a glass transition temperature of −20 to 10° C. It is possible to suitably produce food packaging films using the adhesive according to the present invention, and it is also possible to suitably produce a food packaging bag using the food packaging films.

The present invention provides, in an embodiment, an adhesive for food packaging films, wherein the polyesterpolyurethane polyol (A) has a glass transition temperature of −5 to 5° C. The present invention provides, in another embodiment, an adhesive for food packaging films, wherein the polyester polyol (a1) has a hydroxyl value of 15 to 40 mgKOH/g. The present invention provides, in a preferred embodiment, an adhesive for food packaging films, wherein the polyester polyol (B) has a hydroxyl value of 10 to 50 mgKOH/g.

The present invention provides, in still another embodiment, an adhesive for food packaging films, further comprising a silane coupling agent. The present invention provides, in more preferred embodiment, an adhesive for food packaging films, further comprising phosphoric acid.

The present invention provides, in yet another embodiment, an adhesive for food packaging films, wherein the isocyanate compound (a2) comprises at least one selected from an aliphatic isocyanate and an alicyclic isocyanate. The present invention provides, in a still more preferred embodiment, an adhesive for food packaging films further comprising an epoxy resin.

The present invention provides, in another aspect, a food packaging film obtainable by using the adhesive of the present invention. The present invention provides, in a more preferred aspect, a food packaging bag obtainable by using the food packaging film of the present invention.

Effects of the Invention

The adhesive for food packaging films of the present invention comprises a urethane resin obtainable by mixing: (A) a polyesterpolyurethane polyol; (B) a polyester polyol; and (C) an isocyanate component, and the polyesterpolyurethane polyol (A) is obtainable by chain extension of (a1) a polyester polyol with (a2) an isocyanate compound, and the equivalent ratio (NCO/OH) of the isocyanate group of the isocyanate compound (a2) to the hydroxyl group of the polyester polyol (a1) is 0.60 to 0.85, and also the polyester polyol (B) has a glass transition temperature of −20 to 10° C. Therefore, the adhesive for food packaging films is easy to apply and is excellent in initial adhesion, and also has high peel strength after sterilization and is excellent in contents resistance.

When the polyesterpolyurethane polyol (A) has a glass transition temperature of −5 to 5° C., the adhesion of the adhesive for food packaging films is more improved, and the peel strength is more improved just after sterilization. When the polyester polyol (a1) has a hydroxyl value of 15 to 40 mgKOH/g, the adhesive for food packaging films has a viscosity which is more suited for application, and is more excellent in adhesion to a film. When the polyester polyol (B) has a hydroxyl value of 10 to 50 mgKOH/g, the adhesive for food packaging films has more improved adhesion to a film.

When the adhesive for food packaging films further comprises a silane coupling agent, the initial adhesion to a film after aging and the peel strength after sterilization are more improved. When the adhesive for food packaging films further comprises phosphoric acid, the contents resistance is more improved.

When the isocyanate compound (a2) includes at least one selected from an aliphatic isocyanate and an alicyclic isocyanate, the contents resistance is more improved. When the adhesive for food packaging films further comprises an epoxy resin, the contents resistance is more improved. The adhesive according to the present invention is very effective as an adhesive for bonding food packaging films. The food packaging films produced by using the adhesive for food packaging films of the present invention does not cause peeling of the film, and is capable of maintaining the appearance even though it is left to stand at 40° C. for 2 weeks after the sterilization treatment.

BRIEF DESCRIPTION OF DRAWINGS

FIG. 1 is a sectional view showing an embodiment of a food packaging film according to the present invention.

DESCRIPTION OF EMBODIMENTS

The adhesive for food packaging films according to the present invention comprises a urethane resin obtainable by mixing: (A) a polyesterpolyurethane polyol; (B) a polyester polyol; and (C) an isocyanate component.

The urethane resin may be obtainable by simultaneously mixing three components of the (A) polyesterpolyurethane polyol, the (B) polyester polyol, and the (C) isocyanate component, or may be obtainable by reacting either the component (A) or (B) with the component (C) in advance, and then mixing the remaining one component, or may be obtainable by mixing the component (A) with the component (B), and reacting the mixed polyol with the component (C).

The reaction between the component (A) and the component (B), and the component (C) can be performed by a known method. Although the urethane resin can be produced by reacting the components (A) to (C) in a solvent, it is also to react the components (A) to (C) without using a solvent. It is also possible to obtain the urethane resin while allowing an unreacted monomer isocyanate to exist in the reaction mixture, using an excess isocyanate. It is also possible to obtain the urethane resin, as an embodiment of another reaction operation, by controlling the reaction using a catalyst or the like, and allowing a tiny amount of the unreacted monomer isocyanate to exist in the mixture.

In the present invention, the polyesterpolyurethane polyol (A) is obtainable by chain extension of the (a1) polyester polyol with the (a2) isocyanate compound. Since the equivalent ratio (NCO/OH) of the isocyanate group based on the isocyanate compound (a2) to the hydroxyl group based on the polyester polyol (a1) is from 0.60 to 0.85, the adhesive for food packaging films of the present invention has a viscosity suited for application and is excellent in initial adhesion, and also has high peel strength after sterilization and is excellent in contents resistance.

The equivalent ratio (NCO/OH) can be calculated by the following equation (I).

[Equation 1]

$$NCO/OH = \frac{\text{Necessary amount of isocyanate (parts by weight)} \times (NCO\%/100)/42.02}{\text{Hydroxyl value} \times \text{polyesterpolyol (parts by weight)}/1000/56.11} \quad (I)$$

In the present invention, the polyester polyol (a1) means a compound which belongs to "main chain type" polyesters and has ester bonds and hydroxyl groups in the "main chain". The hydroxyl group is generally positioned on the end of the main chain, and acts as a functional group reacting with an isocyanate group.

The polyester polyol (a1) is generally obtainable by the condensation polymerization reaction of a low molecular polyol with a dicarboxylic acid or an anhydride thereof. Examples of the dicarboxylic acid include oxalic acid, malonic acid, succinic acid, glutaric acid, adipic acid, pimelic acid, suberic acid, azelaic acid, sebacic acid, decanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, phthalic acid, terephthalic acid, isophthalic acid, naphthalenedicarboxylic acid, trimellitic acid, trimesic acid, cyclohexanedicarboxylic acid and the like. These dicarboxylic acids are used alone or in combination. Examples of the carboxylic anhydride include acetic anhydride, propionic anhydride, succinic anhydride, maleic anhydride, phthalic anhydride, and trimellitic anhydride. These dicarboxylic anhydrides are used alone or in combination.

The low molecular polyol preferably has 1 to 3 functional groups, and particularly preferably a difunctional polyol that is, a so-called diol. The low molecular polyols can be used alone or in combination. Examples of the diol include low molecular weight diols such as ethylene glycol, 1-methylethylene glycol, 1-ethylethylene glycol, propylene glycol, butanediol, pentanediol, hexanediol, heptanediol, octanediol, nonanediol, decanediol, neopentyl glycol, 2-methyl-1,3-propanediol, cyclohexanedimethanol, 2,4-dimethyl-1,5-pentanediol, 2,4-dibutyl-1,5-pentanediol and the like. At least one selected from ethylene glycol, butanediol, hexanediol, octanediol, and decanediol is preferable.

In the present invention, the polyester polyol (a1) preferably has an acid value of 0.1 to 2 mgKOH/g. When the acid value of the polyester polyol (a1) is within the above range, the adhesive for food packaging films of the present invention has a viscosity more suited for application and is excellent in adhesion to a film.

On the assumption that all acid groups included in 1 g of the resin are free acids, the "acid value" of the polyester polyol (a1) according to the present invention is expressed by a calculated value of a number of milligrams of potassium hydroxide which is needed to neutralize the acid. Therefore, even though the acid groups exist as a base in an actual system, they are assumed as a free acid. The "acid value" according to the present invention is determined by dissolving the polyester polyol (a1) in a solvent, adding phenolphthalein as an indicator, and titrating with a 0.1 mol/l potassium hydroxide-ethanol solution according to JISK 0070. Specifically, the "acid value" is determined by the following equation (II):

$$(II) \qquad [\text{Equation 2}]$$

where
B: Amount of 0.1 mol/l potassium hydroxide-ethanol solution used in the measurement (ml)
F: Factor of 0.1 mol/l potassium hydroxide-ethanol solution
S: Mass of sample (g)
5.611: Formula weight of potassium hydroxide 56.11×1/10

In the present invention, the polyester polyol (a1) preferably has a hydroxyl value of 15 to 40 mgKOH/g. When the hydroxyl value of the polyester polyol (a1) is within the above range, the adhesive for food packaging films of the present invention has a viscosity more suited for application and is more excellent in adhesion to a film. As used herein, the hydroxyl value means a number of mgs of potassium hydroxide which is required to neutralize acetic acid bonding to the hydroxyl group when 1 g of the resin is acetylated.

The "hydroxyl value" according to the present invention is determined according to JISK 0070 by adding an acetylation reagent to the polyester polyol (a1), heating with a glycerin solution, allowing to cool, then adding phenolphthalein as an indicator, and titrating with a potassium hydroxide-ethanol solution. Specifically, the "hydroxyl value" is determined by the following equation (III):

$$(III) \qquad [\text{Equation 3}]$$

S: Collected amount of sample (g)
B: Consumed amount of 0.5 mol/l potassium hydroxide-ethanol solution in blank test (ml)
C: Consumed amount of 0.5 mol/l potassium hydroxide-ethanol solution used in the measurement (ml)
F: Factor of 0.5 mol/l potassium hydroxide-ethanol solution
D: Acid value (mgKOH/g)

In the present invention, the polyester polyol (a1) preferably has a number average molecular weight of 2,500 to 7,500. When the number average molecular weight of the polyester polyol (a1) is within the above range, the adhesive for food packaging films of the present invention is more excellent in coatability.

As used herein, the number average molecular weight (Mn) means a value in which a value measured by gel permeation chromatography (GPC) is calibrated using polystyrene standards. Specifically, the Mn can be obtained using the following GPC system and measuring method. HCL-8220GPC manufactured by TOSOH CORPORATION is used as a GPC system, and RI is used as a detector. Two TSKgel SuperMultipore HZ-M columns manufactured by TOSOH CORPORATION are used as a GPC column. A sample was dissolved in tetrahydrofuran and the measurement was performed under the conditions of a flow rate of 0.35 ml/min and a column temperature of 40° C. to obtain a measured value. Using a calibration curve in which polystyrene having a monodispersed molecular weight is used as a standard substance, the measured value was calibrated to obtain the objective Mn. This measurement is applied not only to the Mn of the polyester polyol (a1), but also to the Mn of the below-mentioned polyesterpolyurethane polyol (A).

The glass transition temperature of the polyester polyol (a1) is measured using a differential scanning calorimeter. With respect to a proper amount of a sample, a DSC curve was measured at a temperature rise rate of 10° C./minute and the temperature of an inflection point of the obtained DSC curve was regarded as the glass transition temperature. This measurement is applied not only to the glass transition temperature of the polyester polyol (a1), but also to the glass transition temperatures of the polyesterpolyurethane polyol (A) and the polyesterpolyol (B).

An isocyanate compound (a2) is mixed with a polyester polyol (a1) so as to extend the chain length of the polyester polyol (a1) to obtain a polyesterpolyurethane polyol (A). The isocyanate compound (a2) may be any one of an aliphatic isocyanate, an alicyclic isocyanate, and an aromatic isocyanate as long as the objective adhesive of the present invention can be obtained. It is preferred to include an aliphatic isocyanate and/or an alicyclic isocyanate, considering the adhesive is used for food packaging applications.

As used herein, the "aliphatic isocyanate" means a compound which has a chain-like hydrocarbon chain to which an isocyanate group is directly bonded, and also has no cyclic hydrocarbon chain. The "aliphatic isocyanate" may have an aromatic ring, but the isocyanate group is not bonded directly to the aromatic ring. Furthermore, as used herein, the cyclic hydrocarbon chain does not contain aromatic rings.

The "alicyclic isocyanate" means a compound which has a cyclic hydrocarbon chain, and may have a chain-like hydrocarbon chain. The isocyanate group may be directly bonded to the cyclic hydrocarbon chain, or may be directly bonded to a chain-like hydrocarbon chain which may be present. Although the "alicyclic isocyanate" may have an aromatic ring, the isocyanate group is not directly bonded to the aromatic ring.

The "aromatic isocyanate" means a compound which has an aromatic ring and in which the isocyanate group is directly bonded to the aromatic ring. Therefore, even though an isocyanate compound has an aromatic ring in the molecule, when the isocyanate group is not directly bonded to the aromatic ring, the isocyanate compound is classified into the aliphatic isocyanate or alicyclic isocyanate.

Therefore, for example, 4,4'-diphenylmethane diisocyanate (OCN—$C_6H_4$—$CH_2$—$C_6H_4$—NCO) corresponds to the aromatic isocyanate, since the isocyanate group is directly bonded to the aromatic ring. On the other hand, for example, xylylene diisocyanate (OCN—$CH_2$—$C_6H_4$—$CH_2$—NCO) corresponds to the aliphatic isocyanate, although it has an aromatic ring, since the isocyanate group is not directly bonded to the aromatic ring and is bonded to the methylene group. The aromatic ring may have a ring-fused structure in which two or more benzene rings are condensed.

Examples of the aliphatic isocyanate include 1,4-diisocyanatobutane, 1,5-diisocyanatopentane, 1,6-diisocyanatohexane (hereinafter referred to as HDI), 1,6-diisocyanato-2,2,4-trimethylhexane, methyl 2,6-d iisocyanatohexanoate (lysine diisocyanate), 1,3-bis(isocyanatomethyl) benzene (xylylene diisocyanate) and the like.

Examples of the alicyclic isocyanate include 5-isocyanato-1-isocyanatomethyl-1,3,3-trimethylcyclohexane (isophorone diisocyanate), 1,3-bis(isocyanatomethyl)cyclohexane (hydrogenated xylylene diisocyanate), bis(4-isocyanatocyclohexyl)methane (hydrogenated diphenylmethane diisocyanate), 1,4-diisocyanatocyclohexane and the like. Examples of the aromatic isocyanate include 4,4'-diphenylmethane diisocyanate, p-phenylene diisocyanate, m-phenylene diisocyanate, 2,4-tolylene diisocyanate, 2,6-tolylene diisocyanate and the like.

These isocyanates can be used alone or in combination. Considering food-related regulations, it is preferred to use 5-isocyanato-1-isocyanatomethyl-1,3,3-trimethylcyclohexane (isophorone diisocyanate).

In the present invention, the polyesterpolyurethane polyol (A) preferably has a glass transition temperature (Tg) of −5 to 5° C. When the Tg is within the above range, the adhesion of the adhesive for food packaging films of the present invention is more improved and, immediately after sterilization, the peel strength is more improved. The glass transition temperature (Tg) of the polyesterpolyurethane polyol (A) is also measured by the same measurement method as described for the polyester polyol (a1).

In the present invention, the polyesterpolyurethane polyol (A) preferably has a number average molecular weight (Mn) of 10,000 to 20,000. When the number average molecular weight of the polyesterpolyurethane polyol (A) is within the above range, coatability to a film of the adhesive for food packaging films of the present invention is more improved.

In the measurement of the Mn of the polyesterpolyurethane polyol (A), it is possible to use the same measurement method as described for the polyester polyol (a1).

In the present invention, the polyester polyol (B) has a glass transition temperature of −20 to 10° C. When the Tg is within the above range, the adhesion of the adhesive for food packaging films of the present invention is more improved and, immediately after sterilization, the peel strength is more improved. Concrete examples of the polyester polyol (a1) are applied to concrete examples of the polyester polyol (B). However, there is no need that the component (B) is the same as the component (a1), in the adhesive for food packaging films of the present invention. The polyester polyol (B) may be different from the polyester polyol (a1).

The polyester polyol (B) preferably has an acid value of 0.1 to 2 mgKOH/g. When the acid value is within the above range, the adhesion to a film of the adhesive for food packaging films of the present invention is more improved. The acid value of the polyester polyol (B) is determined by the same manner as in the case of the acid value of the polyester polyol (a1). When the acid value of the polyester polyol (B) is within the above range, the adhesive for food packaging films of the present invention has a viscosity more suited for application (or coating) and is more excellent in adhesion to a film.

The polyester polyol (B) preferably has a hydroxyl value of 10 to 50 mgKOH/g. When the hydroxyl value is within the above range, the adhesion to the film of the adhesive for food packaging films of the present invention is more improved. The hydroxyl value of the polyester polyol (B) is determined by the same manner as in the case of the hydroxyl value of the polyester polyol (a1).

In the present invention, an isocyanate component (C) includes the previously mentioned isocyanate compound (a2). The isocyanate component (C) preferably includes at least one selected from HDI, IPDI, XDI, and modifications thereof, and particularly preferably at least one selected from an isocyanurate of 1,6-diisocyanatohexane (HDI), a trimethylolpropane adduct of isophorone diisocyanate (IPDI), and a trimethylolpropane adduct of xylylene diisocyanate (XDI). When the isocyanate component (C) includes the above isocyanate, the contents resistance of the adhesive for food packaging films is more improved.

In the embodiment of the present invention, the polyesterpolyurethane polyol (A) is preferably mixed in an amount of 20 to 70 parts by weight (in terms of solid content), more preferably 25 to 50 parts by weight, and most preferably 30 to 50 parts by weight, based on 100 parts by weight of the total weight of the components (A) to (C). When the polyesterpolyurethane polyol (A) is blended in an amount within the above range, the peel strength and the contents resistance of the adhesive for food packaging films of the present invention are more improved.

The adhesive for food packaging films of the present invention preferably comprises not only the components (A) to (C), but also a silane coupling agent (D) and/or an epoxy resin (E). When the adhesive for food packaging films of the present invention comprises the silane coupling agent (D), initial adhesion to the film after aging, and peel strength after sterilization are more improved. It is possible to use, as the silane coupling agent (D), known organic functional silanes (for example, (meth)acryloxyfunctional silanes, epoxy functional silanes, amine functional silanes, non-reactive group-substituted silanes and the like) as an adhesion promotors. Specific examples thereof include vinyltrialkoxysilanes, alkyltrialkoxysilanes, tetraalkoxysilanes, 3-acryloxypropyltrialkoxysilanes, 3-methacryloxypropyltrialkoxysilanes, 3-aminopropyltrimethoxysilane, 3-aminopropyltriethoxysilane, 3-aminopropylmethyldimethoxysilane, N-(2-aminoethyl)-3-aminopropyltrimethoxysilane, 3-glycidyloxymethyltrimethoxysilane, 3-glycidyloxymethyltriethoxysilane, 3-glycidyloxypropyltrimethoxysilane, 2-glycidyloxyethyltrimethoxysilane and the like.

When the adhesive for food packaging films of the present invention comprises the epoxy resin (E), the contents resistance is improved. Examples of the epoxy resin (E) include a glycidyl ether compound, a glycidyl ester compound and the like. Examples of the glycidyl ether compound include a bisphenol type epoxy resin, a novolak type epoxy resin, a bisphenol type epoxy resin, a bixylenol type epoxy resin, a trihydroxyphenylmethane type epoxy resin, and a tetraphenylol ethane type epoxy resin.

Examples of the bisphenol type epoxy resin include a bisphenol A type epoxy resin, a bisphenol F type epoxy resin, a bisphenol S type epoxy resin, a brominated bisphenol A type epoxy resin, a hydrogenated bisphenol A type epoxy resin, and a phenoxy resin. Examples of the novolak type epoxy resin include a phenol novolak type epoxy resin, a cresol novolak type epoxy resin, a brominated phenol novolak type epoxy resin, a naphthalene skeleton-containing phenol novolak type epoxy resin, a dicyclopentadiene skeleton-containing phenol novolak type epoxy resin and the like. Examples of the glycidyl ester compound include terephthalic acid diglycidyl ester and the like. These epoxy resins can be used alone or in combination.

Examples of phosphoric acid used in the present invention include as oxygen acids of phosphorus in the oxygen acids of phosphorus and derivatives thereof, for example, phosphoric acids such as hypophosphorous acid, phosphorous acid, orthophosphoric acid, and hypophosphoric acid; and condensed phosphoric acids such as metaphosphoric acid, pyrophosphoric acid, tripolyphosphoric acid, polyphosphoric acid, and ultraphosphoric acid.

Examples of the derivatives of oxygen acids of phosphorus include phosphates of sodium, potassium and the like; condensed phosphates, for example, monoesters such as monomethyl orthophosphate, monoethyl orthophosphate, monopropyl orthophosphate, monobutyl orthophosphate, mono-2-ethylhexyl orthophosphate, monophenyl orthophosphate, monomethyl phosphite, monoethyl phosphite, monopropyl phosphite, monobutyl phosphite, mono-2-ethylhexyl phosphite, and monophenyl phosphite; di- and triesterified products such as di-2-ethylhexyl orthophosphate, diphenyl orthophosphate, trimethyl orthophosphate, triethyl orthophosphate, tripropyl orthophosphate, tributyl orthophosphate, tri-2-ethylhexyl orthophosphate, triphenyl orthophosphate, dimethyl phosphite, diethyl phosphite, dipropyl phosphite, dibutyl phosphite, di-2-ethylhexyl phosphite, diphenyl phosphite, trimethyl phosphite, triethyl phosphite, tripropyl phosphite, tributyl phosphite, tri-2-ethylhexyl phosphite and triphenyl phosphite and the like; and mono-, di-, and triesterified products from condensed phosphoric acids and alcohols. These oxygen acids of phosphorus or derivatives thereof may be used alone, or two or more thereof may be used in combination.

Among the above compounds, compounds having at least one or more free oxygen acids are particularly preferable, and orthophosphoric acid and polyphosphoric acid are suitable. The added amount is about 0.01 to 10% by weight, preferably about 0.01 to 5% by weight, and preferably about 0.01 to 1% by weight, based on the total composition.

The adhesive for food packaging films of the present invention can be produced by mixing the components (A) to (C), and optionally mixing the component (D), optionally mixing the component (E), optionally mixing phosphoric acid, and optionally mixing other components. There is no particular limitation on the mixing method, as long as the objective adhesive for food packaging films of the present invention can be obtained. There is also no particular limitation on the order of mixing components. The adhesive for food packaging films according to the present invention can be produced without requiring a special mixing method and a special order of mixing. Thus, the obtained adhesive for food packaging films is excellent in both peel strength and contents resistance.

Since the adhesive for food packaging films of the present invention is applied to a film at 15 to 100° C., the adhesive should have a low viscosity in this temperature range. Considering the coatability, the viscosity of the adhesive for food packaging films is preferably within a range of 100 to 5,000 mPa·s (BM type viscometer), and more preferably 100 to 500 mPa·s, at about 20° C. The food packaging film of the present invention is a laminated film produced by using the above-mentioned adhesive for food packaging films. The film includes, for example, a film in which a metal layer is formed on a plastic base material, and a film in which a metal layer is not formed on a plastic base material.

The food packaging film can be produced by applying the adhesive for food packaging films of the present invention to a film. The application can be performed by various methods such as gravure coating, wire bar coating, air knife coating, die coating, lip coating, and comma coating methods. The food packaging film can be produced by laminating plural films coated with the present adhesive for food packaging films. When the adhesive for food packaging films is applied to the film, the coating amount is preferably within a range of 1 $g/m^2$ to 100 $g/m^2$, more preferably 2 to 10 $g/m^2$, and most preferably 2 to 10 $g/m^2$.

An embodiment of the food packaging film according to the present invention is exemplified in FIG. 1, but the present invention is not limited to these embodiments. FIG. 1 shows a sectional view of a food packaging film 10. This food packaging film 10 is a laminate comprising one metal foil 14 and two plastic films 12 and 13, and the plastic films 12 and 13 are adhered on both sides of the metal foil 14 by using adhesive layers 11, respectively. More specifically, the plastic film 12 is preferably, for example, a polyethylene terephthalate (PET) film, the film 13 is preferably a polyolefin film, more preferably a PP film, and most preferably a CPP film. The metal foil 14 is inserted between them. The metal foil 14 may be, for example, an aluminum foil. The film 12 is bonded to the metal foil 14, and the film 13 is bonded to the metal foil 14 by the adhesive layers 11 for food packaging films, respectively. Examples Of the film to be laminated include plastic films produced from polyethylene terephthalates, nylons, polyethylenes, polypropylenes, and polyvinyl chlorides; metal foils such as aluminum foil; deposited films such as metal deposited films and silica deposited films; metal films produced from stainless steel, steel, copper, and lead. Moreover, the thickness of the film to be laminated, for example, plastic film is preferably within a range of 5 to 200 μm.

A food packaging bag can be produced, for example, by heat-sealing the food packaging film of the present invention. The food packaging bag can include foods. Examples of foods to be included are foods sterilized by autoclaving and heating (i.e. retort foods), and examples of the retort foods include curries, stews, meat sauces, soups and the like. The food packaging film of the present invention can be preferably used so as to produce a food packaging bag for including and sealing retort foods, so-called retort pouch. Since the food packaging film of the present invention is produced by using the above-mentioned adhesive for food packaging films, the film is less likely to be peeled off and does not cause a change in appearance even though 2 weeks have passed after a sterilization treatment of contents. Therefore, the food packaging film is excellent in contents resistance as compared to a conventional food packaging film.

EXAMPLES

The present invention will be described below by way of Examples and Comparative Examples, and these Examples are merely for illustrative purposes and are not meant to be limiting on the present invention.

Synthesis of (a1) Polyester Polyol

Synthetic Example 1

Synthesis of (a1-1) Polyester Polyol

After charging 43.4 g of isophthalic acid, 9.2 g of ethylene glycol, 33.4 g of neopentyl glycol, and 0.02 g of tetraisopropyl titanate, the esterification reaction was performed under nitrogen flow at 180 to 240° C. After distilling off a predetermined amount of water, 34.0 g of sebacic acid was added and the esterification reaction was performed at 180 to 240° C. After gradually reducing the pressure, excess alcohol was removed out of the system at 200 to 240° C. to obtain a polyester polyol (a1-1) having an acid value of 0.7 mgKOH/g and a hydroxyl value of 31 mgKOH/g.

Synthetic Examples 2 to 6

Syntheses of (a1-2) to (a1-6) Polyester Polyols

According to the monomer compositions shown in Table 1, polyester polyols (a1-2) to (a1-6) were synthesized. The syntheses were performed using the same method as in the synthesis of the polyester polyol (a1-1). Acid values and hydroxyl values were calculated by the previously mentioned calculation formulas (II) and (Ill) in accordance with JISK 0070.

TABLE 1

| | | (a1) Polyester polyols | | | | | |
|---|---|---|---|---|---|---|---|
| | | a1-1 | a1-2 | a1-3 | a1-4 | a1-5 | a1-6 |
| Monomers | IPA | 43.4 | 33.8 | 43.4 | 44.0 | 44.0 | 33.8 |
| | SA | 34.0 | 41.3 | 34.0 | 34.2 | 34.2 | 41.2 |
| | EG | 9.2 | 7.4 | 9.2 | 8.5 | 8.5 | 8.7 |
| | NPG | 33.4 | 37.6 | 33.4 | 33.3 | 33.3 | 36.7 |
| | TIPT | 0.02 | 0.02 | 0.02 | 0.02 | 0.02 | 0.02 |
| Polyester polyols | Acid value (mgKOH/g) | 0.7 | 0.1 | 0.6 | 0.2 | 0.2 | 0.1 |
| | Hydroxyl value (mgKOH/g) | 31 | 20 | 20 | 22 | 14 | 37 |

The monomers and other components shown in Table 1 are shown below.
Isophthalic acid (IPA)
Sebacic acid (SA)
Ethylene glycol (EG)
Neopentyl glycol (NPG)
Tetraisopropyl titanate (TIPT)

Synthesis of (A) Polyesterpolyurethane Polyol

Synthesis of (A1) Polyesterpolyurethane Polyol

To 100 g of the polyester polyol (a1-1), 3.93 g of 5-isocyanato-1-isocyanatomethyl-1,3,3-trimethylcyclohexane (isophorone diisocyanate) was added under nitrogen atmosphere so that the equivalent ratio (NCO/OH) of the isocyanate group to the hydroxyl group becomes 0.64, and then the reaction was performed at 120 to 130° C. until the adsorption of the isocyanate group by FT-IR disappeared to obtain a polyesterpolyurethane polyol (A1) having a glass transition temperature (Tg) of 0.9° C. and a number average molecular weight of 10,300. To the polyesterpolyurethane polyol (A1), ethyl acetate was added to obtain a polyesterpolyurethane polyol-ethyl acetate solution (non-volatile content of 50%).

Syntheses of (A2) to (A'6) Polyesterpolyurethane Polyols

Polyesterpolyurethane polyols were synthesized by mixing 5-isocyanato-1-isocyanatomethyl-1,3,3-trimethylcyclohexanes (isophorone diisocyanates) (IPDI) in the weights shown in Table 2 with 100 parts by weight (in terms of solid content) of the respective polyester polyols (a1-2) to (a1-6) in the same manner as in the synthesis of the polyesterpolyurethane polyol (A1). Physical properties of the obtained polyesterpolyurethane polyols are shown in Table 2.

TABLE 2

| | | (A) Polyesterpolyurethane polyols | | | | | |
|---|---|---|---|---|---|---|---|
| | | A1 | A2 | A3 | A4 | A'5 | A'6 |
| (a1) Polyester polyols | (a1-1) | 100 | | | | | |
| | (a1-2) | | 100 | | | | |
| | (a1-3) | | | 100 | | | |
| | (a1-4) | | | | 100 | | |
| | (a1-5) | | | | | 100 | |
| | (a1-6) | | | | | | 100 |
| (a2) Isocyanate compound | IPDI | 3.93 | 2.42 | 4.42 | 3.57 | 1.53 | 6.60 |
| Equivalent ratio NCO/OH | | 0.64 | 0.61 | 0.72 | 0.82 | 0.55 | 0.90 |
| Tg of polyesterpolyurethane polyols (° C.) | | 0.9 | 3.1 | 4.7 | −0.9 | 1.8 | 2.5 |
| Number average molecular weight of polyesterpolyurethane polyols | | 10,300 | 11,800 | 13,000 | 12,300 | 11,000 | 17,000 |

Synthesis of (B) Polyester Polyol

Synthetic Example 7

(B1) Polyester Polyol

After charging 52.9 g of isophthalic acid, 5.3 g of ethylene glycol, 15.7 g of neopentyl glycol, 30.1 g of 1,6-hexanediol, and 0.02 g of tetraisopropyl titanate, the esterification reaction was performed under nitrogen flow at 180 to 240° C. After distilling off a predetermined amount of water, 16.0 g of adipic acid was added and the esterification reaction was performed at 180 to 240° C. After gradually reducing the pressure, excess alcohol was removed out of the system at 200 to 250° C. to obtain a polyester polyol (B1) having Tg of −9° C., an acid value of 0.1 mgKOH/g, and a hydroxyl value of 12 mgKOH/g.

Synthetic Example 8

(B2) Polyester Polyol

After charging 49.9 g of isophthalic acid, 16.3 g of ethylene glycol, 15.8 g of neopentyl glycol, 23.3 g of 1,6-hexanediol, and 0.02 g of tetraisopropyl titanate, the esterification reaction was performed under nitrogen flow at 180 to 240° C. After distilling off a predetermined amount of water, 14.6 g of adipic acid was added and the esterification reaction was performed at 180 to 240° C. After gradually reducing the pressure, excess alcohol was removed out of the system at 200 to 250° C. to obtain a polyester polyol (B2) having Tg of −3° C., an acid value of 0.1 mgKOH/g, and a hydroxyl value of 16 mgKOH/g.

Synthetic Example 9

(B3) Polyester Polyol

After charging 54.1 g of isophthalic acid, 12.1 g of ethylene glycol, 15.8 g of neopentyl glycol, 23.3 g of 1,6-hexanediol, and 0.02 g of tetraisopropyl titanate, the esterification reaction was performed under nitrogen flow at 180 to 240° C. After distilling off a predetermined amount of water, 14.6 g of adipic acid was added and the esterification reaction was performed at 180 to 240° C. After gradually reducing the pressure, excess alcohol was removed out of the system at 200 to 250° C. to obtain a polyester polyol (B3) having Tg of 3° C., an acid value of 0.1 mgKOH/g, and a hydroxyl value of 11 mgKOH/g.

Synthetic Example 10

(B4) Polyester Polyol

After charging 52.9 g of isophthalic acid, 5.3 g of ethylene glycol, 15.7 g of neopentyl glycol, 30.1 g of 1,6-hexanediol, and 0.02 g of tetraisopropyl titanate, the esterification reaction was performed under nitrogen flow at 180 to 240° C. After distilling off a predetermined amount of water, 16.0 g of adipic acid was added and the esterification reaction was performed at 180 to 240° C. After gradually reducing the pressure, excess alcohol was removed out of the system at 200 to 250° C. to obtain a polyester polyol (B4) having Tg of −13° C., an acid value of 0.1 mgKOH/g, and a hydroxyl value of 13 mgKOH/g.

Synthetic Example 11

(B5) Polyester Polyol

After charging 53.4 g of isophthalic acid, 5.0 g of ethylene glycol, 15.0 g of neopentyl glycol, 30.6 g of 1,6-hexanediol, and 0.02 g of tetraisopropyl titanate, the esterification reaction was performed under nitrogen flow at 180 to 240° C. After distilling off a predetermined amount of water, 16.0 g of adipic acid was added and the esterification reaction was performed at 180 to 240° C. After gradually reducing the pressure, excess alcohol was removed out of the system at 200 to 250° C. to obtain a polyester polyol (B5) having Tg of −9° C., an acid value of 0.4 mgKOH/g, and a hydroxyl value of 21 mgKOH/g.

Synthesis Example 12

(B6) Polyester Polyol

After charging 53.4 g of isophthalic acid, 5.0 g of ethylene glycol, 15.0 g of neopentyl glycol, 30.6 g of 1,6-hexanediol, and 0.02 g of tetraisopropyl titanate, the esterification reaction was performed under nitrogen flow at 180 to 240° C. After distilling off a predetermined amount of water, 16.0 g of adipic acid was added and the esterification reaction was performed at 180 to 240° C. After gradually reducing the pressure, excess alcohol was removed out of the system at 200 to 250° C. to obtain a polyester polyol (B6) having Tg of −8° C., an acid value of 0.3 mgKOH/g, and a hydroxyl value of 15 mgKOH/g.

Commercially available polyester polyols were used as polyester polyols (B7') to (B9'). (B'7) VYLON 637 (trade name), manufactured by TOYOBO CO., LTD. (B'8) VYLON 240 (trade name), manufactured by TOYOBO CO., LTD. (B'9) TESLAC 2471 (trade name), manufactured by Hitachi Chemical Co., Ltd. Physical properties of the synthesized polyester polyols (B1) to (B6) and the commercially available polyester polyols (B'7) to (B'9) are shown in Table 3.

TABLE 3

| | (B) Polyester polyols | | | | | | | | |
|---|---|---|---|---|---|---|---|---|---|
| | B1 | B2 | B3 | B4 | B5 | B6 | B'7 | B'8 | B'9 |
| Tg (° C.) | −9 | −3 | 3 | −13 | −9 | −8 | 21 | 60 | −35 |
| Acid value (mgKOH/g) | 0.1 | 0.1 | 0.1 | 0.1 | 0.4 | 0.3 | <2 | <2 | <1 |
| Hydroxyl value (mgKOH/g) | 12 | 16 | 11 | 13 | 21 | 15 | 5 | 8 | 56 |

<Measurement of Glass Transition Temperature (Tg)>

Using a differential scanning calorimeter (SII NanoTechnology DSC6220, manufactured by SII NanoTechnology Inc.), glass transition temperatures (Tg) of the polyester-polyurethane polyols (A) and the polyester polyols (B) were measured at a temperature rise rate of 10° C./minute. A DSC curve of 10 mg of each polyol was taken and an inflection point of the DSC curve was regarded as a glass transition temperature.

<Measurement of Acid Value>

Using the previously mentioned calculation formula (II), acid values of the polyester polyols (B1) to (B6) were determined in accordance with JISK 0070. Acid values of the polyester polyols (B'7) to (B'9) are catalog values. These numerical values are shown in Table 2.

<Measurement of Hydroxyl Value>

Using the previously mentioned calculation formula (III), hydroxyl values of the polyester polyols (B1) to (B6) were determined in accordance with JISK 0070. Hydroxyl values of polyester polyols (B'7) to (B'9) are catalog values. These numerical values are shown in Table 2.

<Calculation of Equivalent Ratio NCO/OH>

Using the following equation (I), NCO/OH (equivalent ratio) was calculated.

[Equation 1]

$$\text{NCO/OH} = \frac{\text{Necessary amount of isocyanate (parts by weight)} \times (\text{NCO \%}/100)/42.2}{\text{Hydroxyl value} \times \text{polyesterpolyol (parts by weight)}/1{,}000/56.11} \quad (I)$$

The NCO %, hydroxyl value, necessary amount of an isocyanate compound, and polyester polyol were calculated considering only the resin components.

The above-mentioned polyesterpolyurethane polyol (A) and polyester polyol (B) were mixed with components (C) to (E) to prepare an adhesive for food packaging films. Details of the component (C) to (E) are shown below.

(C) Isocyanate Component
(C1) Trimethylolpropane adduct of xylylene diisocyanate (TAKENATE D110N (trade name), manufactured by Mitsui Chemicals, Inc.)
(C2) Trimethylolpropane adduct of isophorone diisocyanate (TAKENATE D140N (trade name), manufactured by Mitsui Chemicals, Inc.)
(D) Silane coupling agent
(D1) 3-Glycidyloxypropyltrimethoxysilane (Dynasylan GLYMO (trade name), manufactured by Evonik Industries)
(D2) N-(2-aminoethyl)-3-aminopropyltrimethoxysilane (Dynasylan DAMO-T (trade name), manufactured by Evonik Industries)
(E) Epoxy Resin
(E1) Bisphenol A type epoxy resin (jER1001 (trade name), manufactured by Mitsubishi Chemical Corporation)
(E2) Bisphenol A type epoxy resin (jER1002 (trade name), manufactured by Mitsubishi Chemical Corporation)
(E3) Bisphenol A type epoxy resin (jER1004 (trade name), manufactured by Mitsubishi Chemical Corporation)
Phosphoric acid (phosphoric acid, special grade (trade name), manufactured by Wako Pure Chemical Industries, Ltd.)

These components (A) to (E) and phosphoric acid are mixed according to the formulations shown in Tables 4 to 6 to prepare adhesives for food packaging films. The production of an adhesive for food packaging films of Example 1 is shown below.

Example 1

<Production of Adhesive for Food Packaging Films>

As shown in Table 4, 43.5 g of the polyesterpolyurethane polyol (A1) [87 g of an ethyl acetate solution of the polyesterpolyurethane polyol (A1) (solid content of 50.0% by weight)], 43.5 g of the polyester polyol (B1) [87 g of an ethyl acetate solution of the polyester polyol (B1) (solid content of 50.0% by weight)], 0.2 g of the component (D1), 4.4 g of the component (E2), and 0.01 g of the phosphoric acid were weighed and mixed, and then 7.8 g of the component (C1) and 5.2 g of the component (C2) were added to the mixture. Furthermore, ethyl acetate was added to prepare an adhesive solution having a solid content of 30%, thus obtaining an adhesive for food packaging films of Example 1.

<Production of Samples for Evaluation Test (Adhesive-Coated CPP Sheet and Film Laminate)> First, the adhesive for food packaging films of Example 1 was applied to a cast polypropylene (CPP) sheet (TORAYFAN NO ZK207 (trade name), 70 μm in thickness, manufactured by TORAY ADVANCED FILM CO., LTD.) so that the solid component weight becomes 4 g/m$^2$, and then dried at 80° C. for 5 minutes to obtain an adhesive-coated CPP sheet. Thereafter, the adhesive-coated surface of the adhesive-coated CPP sheet was covered with a mat surface of an aluminum foil (1N30, 50 μm in thickness, manufactured by Sumitomo Light Metal Industries, Ltd.) and then both films were pressed under a clamping pressure of 1.0 MPa at 50° C. for 30 minutes, using a flat press (ASF-5 (trade name, manufactured by SHINTO Metal Industries Corporation)). The pressed both films were aged at 50° C. for 3 days to obtain a film laminate composed of CPP film/adhesive/aluminum foil.

Adhesives for food packaging films of Examples 2 to 8 and Comparative Examples 1 to 7 were produced by mixing the respective components according to the formulations shown in Tables 4 to 6. The adhesives for food packaging films and samples for evaluation test were produced in the same manner as in Example 1. The obtained adhesives for food packaging films were evaluated by the following test procedures.

<Evaluation>

The adhesives for food packaging films were evaluated by the following procedures.

The results are shown in Tables 4 to 6.

1. Adhesive Solution Viscosity

After controlling the temperature of an adhesive solution having a concentration of 50% at 21° C., the viscosity was measured using a BM type viscometer. The measuring rotating speed of a rotor to be used in the measurement was appropriately selected in accordance with the measuring rotating speed.

Evaluation criteria are as follow.

A: 500 mPa·s or less
B: More than 500 mPa·s and 700 mPa·s or less
C: More than 700 mPa·s 2. Initial Adhesion to Film after Aging The film laminate was cut out into test pieces of 15 mm in width. Using a tensile strength testing machine (TENSILON®-250 (trade name), manufactured by ORIENTEC Co., Ltd.), a 90° peel test was performed at room temperature at a testing speed of 300 mm/minute.

Evaluation criteria are as follows.

A: 10 N/15 mm or more
B: 8 N/15 mm or more and less than 10 N/15 mm
C: Less than 8 N/15 mm 3. Peel Strength after Sterilization Test Both ends of the film laminate were heat-sealed so that the CPP film is positioned inside to produce a food packaging bag (or pouch bag) measuring 14 cm ×14 cm. After 100 g of a pseudo-food prepared by mixing salad oil, tomato ketchup, and vinegar in a weight ratio of 1:1:1 was put into the food packaging bag, the food packaging bag was subjected to a sterilization treatment at 121° C. for 30 minutes. After the sterilization treatment, the food packaging bag was cut open and the film laminate was cut out into test pieces of 15 mm in width. Thereafter, the same peel test as in initial adhesion to a film after aging was performed and sterilization test resistance was evaluated.

Evaluation criteria are as follows.
A: 8 N/15 mm or more
B: 6 N/15 mm or more and less than 8 N/15 mm
C: Less than 6 N/15 mm 4. Contents Resistance Test In the same manner as in the measurement of the peel strength after sterilization test, a food packaging bag subjected to a sterilization treatment was stored under the environment at 40° C. for 2 weeks while the pseudo-food is enclosed in the food packaging bag (unopened). The food packaging bag after the storage was cut open, and then it was examined whether or not delamination (lifting or peeling) occurs, by visually observing a state between the CPP film and the aluminum foil.

A: No delamination occurs.
B: Slight delamination occurs.
C: Delamination occurs.

TABLE 4

|  |  | Example 1 | Example 2 | Example 3 | Example 4 | Example 5 |
|---|---|---|---|---|---|---|
| (A) Polyesterpolyurethane polyols | A1 | 43.5 | 43.5 | 43.5 |  |  |
|  | A2 |  |  |  | 43.5 |  |
|  | A3 |  |  |  |  | 43.5 |
|  | A4 |  |  |  |  |  |
|  | A'5 |  |  |  |  |  |
|  | A'6 |  |  |  |  |  |
| (B) Polyester polyols | B1 | 43.5 | 43.5 | 43.5 |  |  |
|  | B2 |  |  |  | 43.5 |  |
|  | B3 |  |  |  |  | 43.5 |
|  | B4 |  |  |  |  |  |
|  | B5 |  |  |  |  |  |
|  | B6 |  |  |  |  |  |
|  | B'7 |  |  |  |  |  |
|  | B'8 |  |  |  |  |  |
|  | B'9 |  |  |  |  |  |
| (C) Isocyanate components | C1 | 7.8 | 7.8 | 7.8 | 7.8 | 7.8 |
|  | C2 | 5.2 | 5.2 | 5.2 | 5.2 | 5.2 |
| (D) Silane coupling agents | D1 | 0.2 | 0.2 | 0.2 | 1 | 0.2 |
|  | D2 |  |  | 0.4 | 0.4 |  |
| (E) Epoxy resins | E1 |  |  |  | 4.4 |  |
|  | E2 | 4.4 | 4.4 | 4.4 |  | 4.4 |
|  | E3 |  |  |  |  |  |
| Phosphoric acid |  | 0.01 | 0.1 | 0.01 | 0.1 | 0.01 |
| Adhesive solution viscosity (50%) (mPa · s/21° C.) |  | 460 A | 460 A | 460 A | 600 B | 650 B |
| Initial adhesion after aging (N/15 mm) |  | 11 A | 9 A | 10 A | 8.5 B | 9 A |
| Peel strength after sterilization (N/15 mm) |  | 9.5 A | 9.5 A | 10.5 A | 9.5 A | 8.5 A |
| Contents resistance test, appearance of food packaging bag after 2 weeks at 40° C. |  | A | A | A | A | A |

TABLE 5

|  |  | Example 6 | Example 7 | Example 8 | Comparative Example 1 | Comparative Example 2 |
|---|---|---|---|---|---|---|
| (A) Polyesterpolyurethane polyols | A1 |  |  |  |  |  |
|  | A2 |  |  |  |  |  |
|  | A3 | 43.5 |  |  |  |  |
|  | A4 |  | 43.5 | 43.5 |  |  |
|  | A'5 |  |  |  | 43.5 |  |
|  | A'6 |  |  |  |  | 43.5 |
| (B) Polyester polyols | B1 |  |  |  |  |  |
|  | B2 |  |  |  |  |  |
|  | B3 |  |  |  |  |  |
|  | B4 | 43.5 |  |  |  |  |
|  | B5 |  | 43.5 | 43.5 | 43.5 |  |
|  | B6 |  |  |  |  | 43.5 |
|  | B'7 |  |  |  |  |  |
|  | B'8 |  |  |  |  |  |
|  | B'9 |  |  |  |  |  |
| (C) Isocyanate components | C1 | 7.8 | 7.8 | 7.8 | 7.8 | 7.8 |
|  | C2 | 5.2 | 5.2 | 5.2 | 5.2 | 5.2 |
| (D) Silane coupling agents | D1 | 1 | 0.2 | 0.2 | 0.2 | 0.2 |
|  | D2 | 0.4 |  |  |  |  |
| (E) Epoxy resins | E1 | 4.4 |  |  |  |  |
|  | E2 |  | 4.4 |  | 4.4 | 4.4 |
|  | E3 |  |  | 4.4 |  |  |

TABLE 5-continued

|  | Example 6 | Example 7 | Example 8 | Comparative Example 1 | Comparative Example 2 |
|---|---|---|---|---|---|
| Phosphoric acid | 0.1 | 0.01 | 0.01 | 0.01 | 0.01 |
| Adhesive solution viscosity (50%) (mPa · s/21° C.) | 470 A | 210 A | 210 A | 420 A | 750 C |
| Initial adhesion after aging (N/15 mm) | 9 A | 12.5 A | 11.5 A | 8.0 B | 14 A |
| Peel strength after sterilization (N/15 mm) | 10 A | 10 A | 10.5 A | 5.5 C | 15 A |
| Contents resistance test, appearance of food packaging bag after 2 weeks at 40° C. | A | A | A | C | B |

TABLE 6

|  |  | Comparative Example 3 | Comparative Example 4 | Comparative Example 5 | Comparative Example 6 | Comparative Example 7 |
|---|---|---|---|---|---|---|
| (A) Polyesterpolyurethane polyols | A1 |  |  | 43.5 | 43.5 | 69.6 |
|  | A2 |  |  |  |  |  |
|  | A3 | 91.5 |  |  |  |  |
|  | A4 |  |  |  |  |  |
|  | A'5 |  |  |  |  |  |
|  | A'6 |  |  |  |  |  |
| (B) Polyester polyols | B1 |  |  |  |  |  |
|  | B2 |  | 87.1 |  |  |  |
|  | B3 |  |  |  |  |  |
|  | B4 |  |  |  |  |  |
|  | B5 |  |  |  |  |  |
|  | B6 |  |  |  |  |  |
|  | B'7 |  |  | 43.5 |  |  |
|  | B'8 |  |  |  | 43.5 |  |
|  | B'9 |  |  |  |  | 17.4 |
| (C) Isocyanate components | C1 | 5.1 | 7.7 | 7.8 | 7.8 | 7.8 |
|  | C2 | 3.4 | 5.2 | 5.2 | 5.2 | 5.2 |
| (D) Silane coupling agents | D1 | 0.2 | 0.2 | 0.2 | 0.2 | 0.2 |
|  | D2 |  |  |  |  |  |
| (E) Epoxy resins | E1 |  |  |  |  |  |
|  | E2 | 4.4 | 4.4 | 4.4 | 4.4 | 4.4 |
|  | E3 |  |  |  |  |  |
| Phosphoric acid |  | 0.01 | 0.01 | 0.01 | 0.01 | 0.01 |
| Adhesive solution viscosity (50%) (mPa · s/21° C.) |  | 720 C | 540 A | 800 C | 845 C | 150 A |
| Initial adhesion after aging (N/15 mm) |  | 14 A | 11 A | 6 C | 4.5 C | 8 B |
| Peel strength after sterilization (N/15 mm) |  | 15 A | 9 A | 2 C | 1.5 C | 1 C |
| Contents resistance test, appearance of food packaging bag after 2 weeks at 40° C. |  | B | C | C | C | C |

As shown in Tables 4 to 5, the adhesives for food packaging films of Examples 1 to 8 have a viscosity suited for application and are excellent in initial adhesion after aging, and also have high peel strength after sterilization and are excellent in contents resistance (acid resistance and oil resistance). The adhesives for food packaging films of Examples are excellent in various performances, and can be suitably used as an adhesive for retort foods which is required to be stored over a long period of time.

On the other hand, as shown in Tables 5 to 6, the adhesives for food packaging films of Comparative Examples are inferior in any one of performances when compared to the adhesives for food packaging films of Examples. The adhesive for food packaging films of Comparative Example 1 has poor contents resistance, since the equivalent ratio NCO/OH is small, and the amount of the urethane bonds is low. The adhesive for food packaging films of Comparative Example 2 is inferior in coating suitability (or coating properties), since the equivalent ratio NCO/OH is large, and the viscosity becomes excessively high. The adhesive for food packaging films of Comparative Example 3 is inferior in coating suitability, since the polyester polyol (B) is not comprised and the polyol component is only the polyesterpolyurethane polyol (A), the amount of the urethane bonds increases, and the viscosity becomes high.

The adhesive for food packaging films of Comparative Example 4 has poor contents resistance, since the polyesterpolyurethane polyol (A) is not comprised and the polyol component is only the polyester polyol (B), and the amount of the urethane bonds decreases. The adhesive for food packaging films of Comparative Example 5 exhibits deterioration of the initial adhesion, since the polyester polyol (B) has the high glass transition temperature. Since the viscosity is too high, the adhesive for food packaging films of Comparative Example 5 is also inferior in coating suitability. The adhesive for food packaging films of Comparative Example 6 exhibits further deterioration of the initial adhesion, since the polyester polyol (B) has the higher glass transition temperature. Furthermore, the adhesive is also inferior in coating suitability, like Comparative Example 5. The adhesive for food packaging films of Comparative Example 7 is significantly inferior in contents resistance, since the polyester polyol (B) has the low glass transition temperature.

INDUSTRIAL APPLICABILITY

The present invention provides an adhesive for food packaging films. The adhesive for food packaging films according to the present invention is excellent in coatability, initial adhesion to a film after aging, peel strength after sterilization, and contents resistance (acid resistance and oil resistance) and is therefore useful for various food applications, and particularly suitable as an adhesive for retort food packaging bags, which is required to have high heat resistance and to be able to be stored over a long period of time.

DESCRIPTION OF REFERENCE NUMERAL

10: Food packaging film, 11: Adhesive layer, 12: PET film, 13: CPP film, 14: Aluminum foil

The invention claimed is:

1. An adhesive for food packaging films, comprising a urethane resin obtained by mixing:
   20 to 70 parts by weight of a polyesterpolyurethane polyol (A) based on 100 parts by weight of the total weight of components (A), (B) and (C);
   a polyester polyol (B); and
   an isocyanate component (C), wherein
   the polyester polyurethane polyol (A) is obtained by chain extension of a polyester polyol (a1) with an isocyanate compound (a2), and an equivalent ratio (NCO/OH) of the isocyanate group of the isocyanate compound (a2) to the hydroxyl group of the polyester polyol (a1) is from 0.6 to 0.85, and wherein
   the polyester polyol (B) has a glass transition temperature of −20 to 10° C.

2. The adhesive for food packaging films according to claim 1, wherein the polyester polyurethane polyol (A) has a glass transition temperature of −5 to 5° C.

3. The adhesive for food packaging films according to claim 1, wherein the polyester polyol (a1) has a hydroxyl value of 15 to 40 mg KOH/g.

4. The adhesive for food packaging films according to claim 1, wherein the polyester polyol (B) has a hydroxyl value of 10 to 50 mg KOH/g.

5. Cured reaction products of the adhesive for food packaging films according to claim 1.

6. A food packaging film comprising the adhesive for food packaging films according to claim 1.

7. A food packaging film comprising cured reaction products of the adhesive for food packaging films according to claim 1.

8. The adhesive for food packaging films according to claim 1, further comprising phosphoric acid.

9. The adhesive for food packaging films according to claim 1, wherein the isocyanate component (C) is an aliphatic isocyanate component or an alicyclic isocyanate component.

10. The adhesive for food packaging films according to claim 1, further comprising an epoxy resin.

11. The adhesive for food packaging films according to claim 1, wherein the polyester polyurethane polyol (A) has a number average molecular weight of 10,000 to 20,000.

12. The adhesive for food packaging films according to claim 1, comprising 25 to 50 parts by weight of the polyester polyurethane polyol (A) based on 100 parts by weight of the total weight of components (A), (B) and (C).

13. The adhesive for food packaging films according to claim 1, wherein the isocyanate compound (a2) is an aliphatic isocyanate compound or an alicyclic isocyanate compound.

14. The adhesive for food packaging films according to claim 1, wherein the polyester polyol (B) is not a polyesterpolyurethane polyol.

15. An adhesive for food packaging films, comprising a urethane resin obtained by mixing:
   20 to 70 parts by weight of a polyesterpolyurethane polyol (A) based on 100parts by weight of the total weight of components (A), (B) and (C);
   a polyester polyol (B) having a glass transition temperature of −20 to 10° C.; and
   an isocyanate component (C), wherein
   the polyester polyurethane polyol (A) is obtained by chain extension of a polyester polyol (a1) with an isocyanate compound (a2), and an equivalent ratio (NCO/OH) of the isocyanate group of the isocyanate compound (a2) to the hydroxyl group of the polyester polyol (a1) is from 0.6 to 0.85,
   the polyester polyol (B) is a condensation polymerization reaction product of a dicarboxylic acid or an anhydride thereof and a polyol;
      the dicarboxylic acid or the anhydride thereof selected from the group consisting of oxalic acid, malonic acid, succinic acid, glutaric acid, adipic acid, pimelic acid, suberic acid, azelaic acid, sebacic acid , decanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, phthalic acid, terephthalic acid, isophthalic acid, naphthalenedicarboxylic acid, trimellitic acid, trimesic acid, cyclohexanedicarboxylic acid, acetic anhydride, propionic anhydride, succinic anhydride, maleic anhydride, phthalic anhydride and combinations thereof; and
      the polyol having 1 to 3 functional groups.

16. The adhesive for food packaging films according to claim 15, wherein the polyester polyol (B) is a condensation polymerization reaction product of a dicarboxylic acid or an anhydride thereof and a polyol;
   the dicarboxylic acid or the anhydride thereof selected from the group consisting of oxalic acid, malonic acid, succinic acid, glutaric acid, adipic acid, pimelic acid, suberic acid, azelaic acid, sebacic acid , decanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, phthalic acid, terephthalic acid, isophthalic acid, naphthalenedicarboxylic acid, trimellitic acid, trimesic acid, cyclohexanedicarboxylic acid, acetic anhydride, propionic anhydride, succinic anhydride, maleic anhydride, phthalic anhydride, and combinations thereof; and
   the polyol selected from the group consisting of ethylene glycol, 1-methylethylene glycol, 1-ethylethylene glycol, propylene glycol, butanediol, pentanediol, hexanediol, heptanediol, octanediol, nonanediol, decanediol, neopentyl glycol, 2-methyl-1,3-propanediol, cyclohexanedimethanol, 2,4-dimethyl-1,5-pentanediol, 2,4-dibutyl-1,5-pentanediol and combinations thereof.

17. The adhesive for food packaging films according to claim 15, wherein the polyester polyol (B) and the polyester polyol (a1) are each independently the condensation polymerization reaction of a dicarboxylic acid or an anhydride thereof and a polyol;

the dicarboxylic acid or the anhydride thereof selected from the group consisting of oxalic acid, malonic acid, succinic acid, glutaric acid, adipic acid, pimelic acid, suberic acid, azelaic acid, sebacic acid, decanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, phthalic acid, terephthalic acid, isophthalic acid, naphthalenedicarboxylic acid, trimellitic acid, trimesic acid, cyclohexanedicarboxylic acid, acetic anhydride, propionic anhydride, succinic anhydride, maleic anhydride, phthalic anhydride, and combinations thereof; and the polyol having 1 to 3 functional groups.

* * * * *

UNITED STATES PATENT AND TRADEMARK OFFICE
CERTIFICATE OF CORRECTION

PATENT NO. : 10,227,516 B2
APPLICATION NO. : 15/176816
DATED : March 12, 2019
INVENTOR(S) : Noriyoshi Kamai et al.

Page 1 of 1

It is certified that error appears in the above-identified patent and that said Letters Patent is hereby corrected as shown below:

In the Specification

Column 5, Line 56: Insert the equation -- Acid value (mgKOH/g) = (5.611 × B × F)/S" -- after "(II):".
Column 6, Line 13: Insert the equation
-- Hydroxyl value (mgKOH/g) = [{(B - C) × F × 28.05}/S] + D -- after "(III):".
Column 6, Line 35: Change "TSKgeI" to -- TSKgel --.
Column 7, Line 36: Change "methyl 2,6-d iisocyanatohexanoate" to
-- methyl 2,6-diisocyanatohexanoate --.
Column 16, Line 51: "TENSILON®-250" to -- TENSILON RTM-250 --.

Signed and Sealed this
Twenty-ninth Day of October, 2019

Andrei Iancu
*Director of the United States Patent and Trademark Office*